US011356726B2

(12) United States Patent
Chih et al.

(10) Patent No.: US 11,356,726 B2
(45) Date of Patent: Jun. 7, 2022

(54) IN-VEHICLE DEVICE AND METHOD FOR MANAGING USER INTERFACES

(71) Applicant: Mobile Drive Technology Co.,Ltd., New Taipei (TW)

(72) Inventors: Yu-Yang Chih, New Taipei (TW); Hsin-Chieh Lin, New Taipei (TW); Po-Jung Huang, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 50 days.

(21) Appl. No.: 16/710,060

(22) Filed: Dec. 11, 2019

(65) Prior Publication Data

US 2020/0196001 A1 Jun. 18, 2020

Related U.S. Application Data

(60) Provisional application No. 62/778,316, filed on Dec. 12, 2018.

(30) Foreign Application Priority Data

Aug. 28, 2019 (CN) .......................... 201910803614.6

(51) Int. Cl.
| | |
|---|---|
| *H04N 21/414* | (2011.01) |
| *H04N 21/431* | (2011.01) |
| *G06F 3/04817* | (2022.01) |
| *G01C 21/36* | (2006.01) |
| *G06F 3/04842* | (2022.01) |
| *H04B 17/318* | (2015.01) |
| *G06F 16/63* | (2019.01) |
| *G08G 1/0968* | (2006.01) |

(52) U.S. Cl.
CPC .......... *H04N 21/414* (2013.01); *G01C 21/36* (2013.01); *G06F 3/04817* (2013.01); *G06F 3/04842* (2013.01); *G06F 16/63* (2019.01); *G08G 1/096838* (2013.01); *H04B 17/318* (2015.01); *H04N 21/431* (2013.01)

(58) Field of Classification Search
CPC .. H04N 21/414; H04N 21/431; H04B 17/318; G06F 16/63; G06F 3/04817; G06F 3/04842; G01C 21/36; G08G 1/096838
See application file for complete search history.

(56) References Cited

U.S. PATENT DOCUMENTS

| | | | |
|---|---|---|---|
| 6,606,543 B1 * | 8/2003 | Sproule .................. | G06F 21/31 340/5.22 |
| 10,219,027 B1 * | 2/2019 | O'Neill ............. | H04N 21/4312 |

(Continued)

FOREIGN PATENT DOCUMENTS

| | | |
|---|---|---|
| TW | 201210389 A | 3/2012 |
| TW | 201617921 A | 5/2016 |
| WO | 2017101325 A1 | 6/2017 |

*Primary Examiner* — Sumaiya A Chowdhury
(74) *Attorney, Agent, or Firm* — ScienBiziP, P.C.

(57) ABSTRACT

A method for managing user interface includes displaying related information of an in-vehicle device using a first user interface. An authority of accessing related information of a handheld device is acquired when the handheld device is in communication with the in-vehicle device. Once the related information of the handheld device is obtained, the related information of the in-vehicle device and the related information of the handheld device are displayed using a second user interface.

8 Claims, 9 Drawing Sheets

(56) References Cited

U.S. PATENT DOCUMENTS

| | | | | |
|---|---|---|---|---|
| 2002/0115477 | A1* | 8/2002 | Singh | H04N 7/17318 |
| | | | | 455/566 |
| 2011/0051665 | A1* | 3/2011 | Huang | H04W 4/02 |
| | | | | 370/328 |
| 2013/0227038 | A1* | 8/2013 | Rich | H04L 51/36 |
| | | | | 709/206 |
| 2013/0275994 | A1* | 10/2013 | Uola | H04L 67/303 |
| | | | | 718/106 |
| 2016/0125077 | A1* | 5/2016 | Jung | G06F 16/639 |
| | | | | 707/769 |

* cited by examiner

IN-VEHICLE DEVICE AND METHOD FOR MANAGING USER INTERFACES

CROSS-REFERENCE TO RELATED APPLICATIONS

This application claims priority to CN Application No. 201910803614.6 filed on Aug. 28, 2019, and claims priority to U.S. provisional Application No. 62/778,316 filed on Dec. 12, 2018, the contents of which are incorporated by reference herein.

FIELD

The subject matter herein generally relates to user interface managing technology, and particularly to an in-vehicle device and a method for managing user interfaces.

BACKGROUND

Currently, an in-vehicle device of a vehicle is designed by a vehicle manufacturer or designed by a third-party manufacturer. The in-vehicle device can be connected to a handheld device such as a mobile device, and the in-vehicle device displays a user interface of the handheld device and a user interface of the in-vehicle device respectively. It may be not convenient for a user to use if there is a gap between the handheld device and the in-vehicle device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
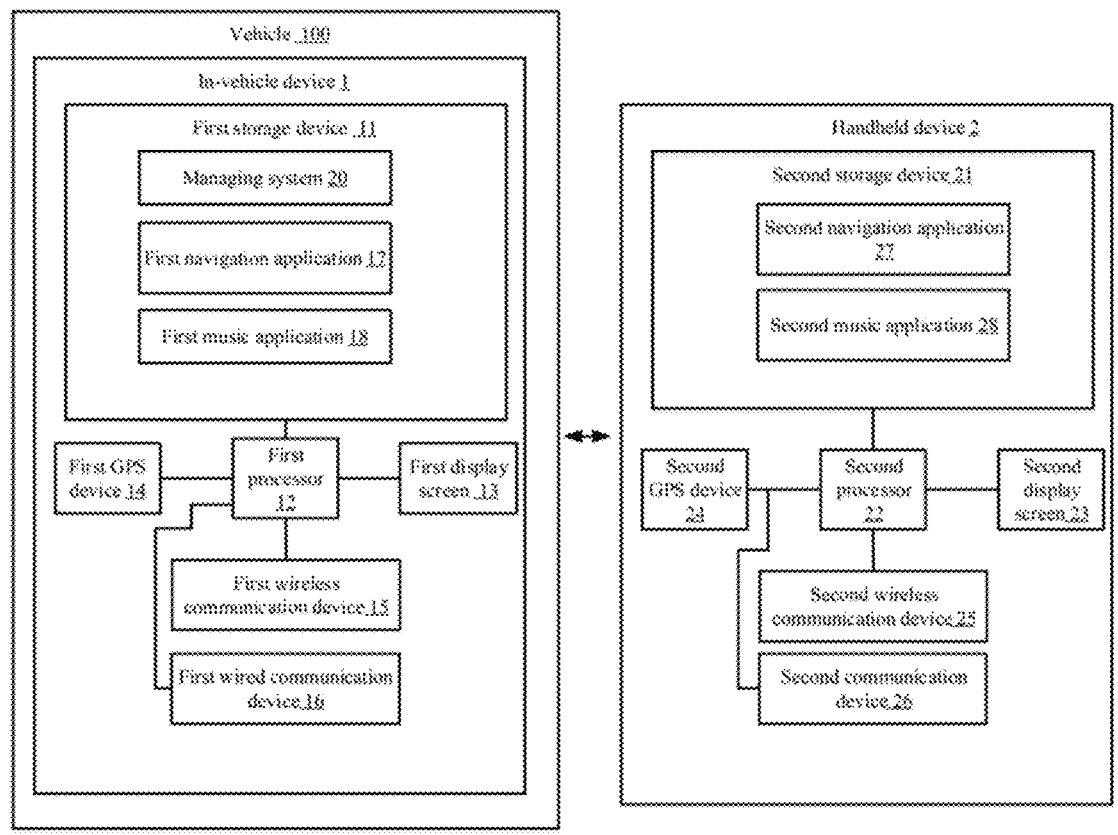
FIG. 1 illustrates a block diagram of one embodiment of an operating environment of a managing system for managing a user interface.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a block diagram of one embodiment of an operating environment of a managing system for managing a user interface. Depending on the embodiment, a managing system 20 is installed in an in-vehicle device 1 (the in-vehicle device is also named as vehicle-mounted device). The managing system 20 is used to manage a user interface of the in-vehicle device 1 and a user interface of a handheld device 2 (the handheld device is also named as handheld electronic device) when the in-vehicle device 1 is in communication with the handheld device 2. For example, the managing system 20 can combine the user interface of the in-vehicle device 1 and the user interface of the handheld device 2 into one user interface when the in-vehicle device 1 is in communication with the handheld device 2. In one embodiment, the in-vehicle device 1 can be installed in a vehicle 100. The vehicle 100 can be a car, a locomotive, or any other suitable device. The handheld device 2 can be a mobile phone, a tablet computer, a personal digital assistant, a laptop, or any other suitable device.

The in-vehicle device 1 can include, but is not limited to, a first storage device 11, a first processor 12, a first display screen 13, a first GPS (Global Positioning System) device, a first wireless communication device 15 and a first wired communication device 16. The handheld device 2 can include, but is not limited to, a second storage device 21, a second processor 22, a second display screen 23, a second GPS device 24, a second wireless communication device 25, and a second wired communication device 26.

It should be understood by those skilled in the art that the structure of the in-vehicle device 1 and the handheld device 2 shown in FIG. 1 does not constitute a limitation of the embodiment of the present disclosure, and the in-vehicle device 1 and the handheld device 2 may further include more or less other hardware or software than the illustration, or have a different layout. For example, the in-vehicle device 1 may further include an operating system, and the handheld device 2 may further include an operating system and a battery. That is, the in-vehicle device 1 and the handheld device 2 shown in FIG. 1 are not to be construed as limiting the present disclosure.

In this embodiment, the in-vehicle device 1 and the handheld device 2 can establish a communication connection in a wired or wireless manner. Specifically, the in-vehicle device 1 and the handheld device 2 can respectively using the first wireless communication device 15 and the second wireless communication device 25, to establish a wireless communication connection. The in-vehicle device 1 and the handheld device 2 can respectively use the first wired communication device 16 and the second wired communication device 26, to establish a wired communication connection.

In this embodiment, the first wireless communication device 15 and the second wireless communication device 25 may be WiFi devices, Bluetooth devices, or other wireless communication deceives, such as radio frequency identification (RFID) devices. In an embodiment, the first wireless communication device 15 and the second wireless communication device 25 can be communication devices that support communication protocols of 3G, 4G, Long Term Evolution (LTE), Worldwide Interoperability for Microwave Access(WIMAX), and 5G, so that the in-vehicle device 1 and the handheld device 2 have the functions of wireless communication described above.

In this embodiment, the first wired communication device 16 and the second wired communication device 26 can be Universal Serial Bus (USB) devices. Thereby, the in-vehicle device 1 and the handheld device 2 can be connected using a USB-compliant transmission line. In one embodiment, the first wired communication device 16 and the second wired communication device 26 can be Universal Serial Bus Type-C (USB Type-C) devices.

In at least one embodiment, the first storage device 11 can include a read-only memory (ROM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other non-transitory storage medium readable by the in-vehicle device 1 that can be used to carry or store data.

In at least one embodiment, the second storage device 21 can include a read-only memory (ROM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other non-transitory storage medium readable by the handheld device 2 that can be used to carry or store data.

In some embodiments, the first storage device 11 can be used to store program codes of computer programs and various data, such as the managing system 20 installed in the in-vehicle device 1, a first navigation application 17, a first music application 18, and one or more other applications and related data of each application. In this embodiment, the first navigation application 17 is used to navigate for the in-vehicle device 1, and the first music application 18 is used to play music. The in-vehicle device 1 can further include one or more other applications such as a radio application or the like.

In some embodiments, the second storage device 21 can be used to store program codes of the computer programs and various data, such as a second navigation application 27, a second music application 28, and one or more other applications installed in the handheld device 2. In this embodiment, the second navigation application 27 is used to navigate for the handheld device 2, and the second music application 28 is used to play music. The handheld device 2 can further include one or more other applications such as instant messaging software such as WeChat, QQ, and the like.

In at least one embodiment, the first processor 12 can be composed of an integrated circuit, for example, can be composed of a single packaged integrated circuit, or can be composed of multiple integrated circuits having same function or different functions. The first processor 12 can include one or more central processing units (CPU), a microprocessor, a digital processing chip, a graphics processor, and various control chips. The first processor 12 is a control unit of the in-vehicle device 1, which connects various components of the in-vehicle device 1 using various interfaces and lines. By running or executing a computer program or modules stored in the first storage device 11, and by invoking data stored in the first storage device 11, the first processor 12 can perform functions of the in-vehicle device 1 and process data of the in-vehicle device 1. For example, the first processor 12 can execute the managing system 20 stored in the first storage device 11 so as to manage a user interface of the in-vehicle device 1 and a user interface of the handheld device 2, to enable a user to operate the in-vehicle device 1 conveniently, when the in-vehicle device 1 is in communication with the handheld device 2.

In at least one embodiment, the second processor 22 can be composed of an integrated circuit, for example, can be composed of a single packaged integrated circuit, or can be composed of multiple integrated circuits having same function or different functions. The second processor 22 can include one or more central processing units (CPU), a microprocessor, a digital processing chip, a graphics processor, and various control chips. The second processor 22 is a control unit of the handheld device 2, which connects various components of the handheld device 2 using various interfaces and lines. By running or executing a computer program or modules stored in the second storage device 21, and by invoking data stored in the second storage device 21, the second processor 22 can perform functions of the handheld device 2 and process data of the handheld device 2.

In this embodiment, the first display screen 13 and the second display screen 23 can be touch screens or non-touch screens. The first display screen 13 can be used to display various data of the in-vehicle device 1, such as a navigation interface of the first navigation application 17, a music playing interface of the first music application 18, and the like. The second display screen 23 can be used to display various data of the handheld device 2, such as a navigation interface of the second navigation application 27, a music playing interface of the second music application 28, and the like.

In this embodiment, the first GPS device 14 can be used to detect a geographic location and a moving speed of the in-vehicle device 1, and can be used to transmit the geographic location and the moving speed of the in-vehicle device 1 to the first navigation application 17, such that the first navigation application 17 can navigate for the in-vehicle device 1 according to the geographic location and the moving speed of the in-vehicle device 1. The second GPS device 24 can be used to detect a geographic location and a moving speed of the handheld device 2, and can transmit the geographic location and the moving speed of the handheld device 2 to the second navigation application 27, thereby enabling the second navigation application 27 to navigate for the handheld device 2 based on the geographic location and the moving speed of the handheld device 2.

Figure 2:
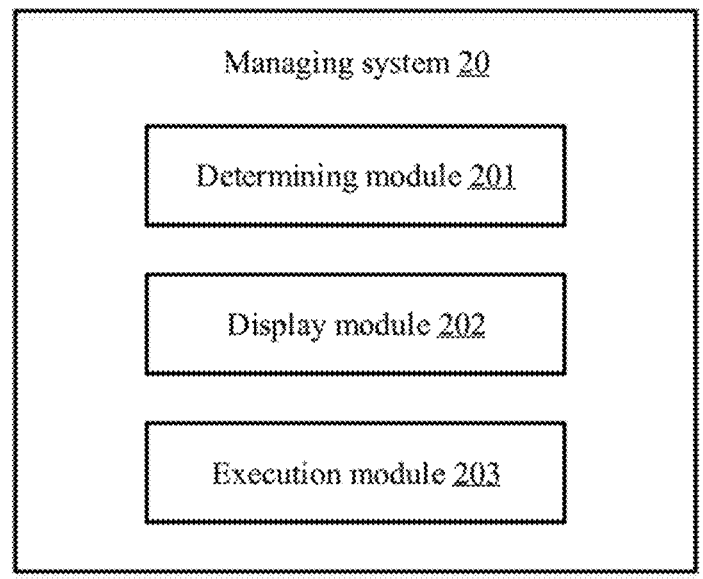
FIG. 2 illustrates a block diagram of one embodiment of modules of the managing system of FIG. 1.

In at least one embodiment, the managing system 20 can include a plurality of modules. As shown in FIG. 2, the plurality of modules can include, but is not limited to, a determining module 201, a display module 202, and an execution module 203. The modules 201-203 can include computerized instructions in a form of one or more computer-readable programs that can be stored in a non-transitory computer-readable medium (e.g., the first storage device 11 of the in-vehicle device 1), and executed by the first processor 12 of the in-vehicle device 1 to implement a function of managing user interface described in FIG. 3.

It should be noted that a module as referred to in the present disclosure refers to program codes of computer programs which are stored in a storage device and can be executed by at least one processor. Each module can include at least one instruction, and the first processor 12 can implement the function of managing user interface described in FIG. 3 by executing the at least one instruction. Detailed functions of each module will be specifically described later in conjunction with the flowchart of FIG. 3.

Figure 3:
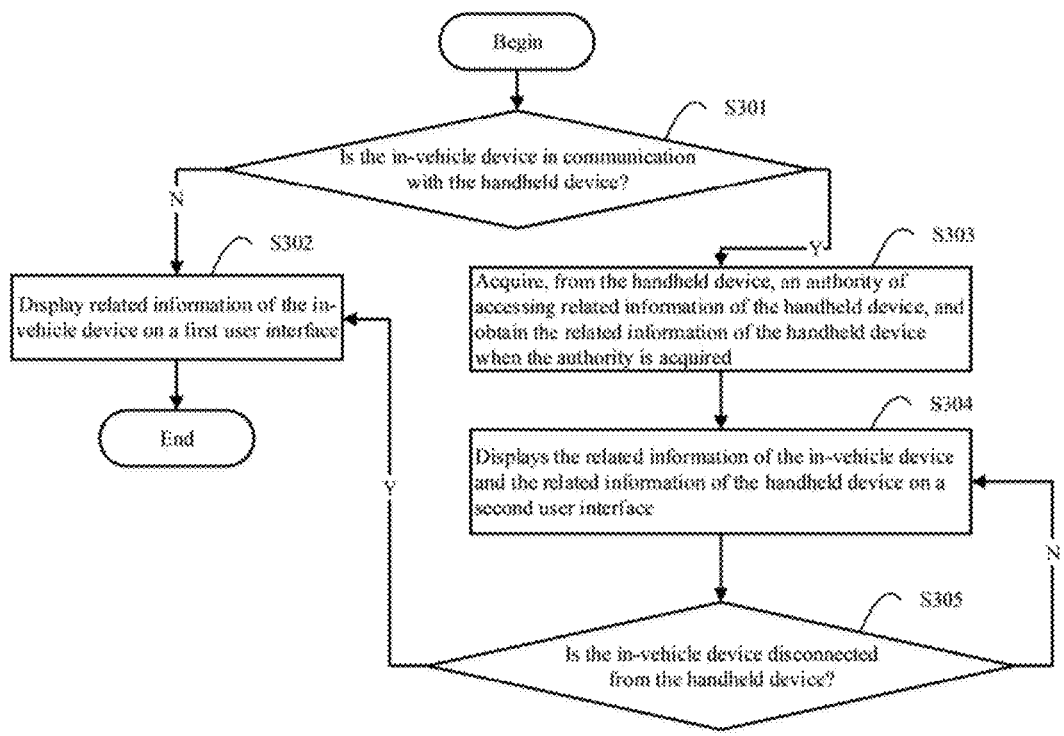
FIG. 3 illustrates a flow chart of one embodiment of managing the user interface using the managing system of FIG. 1.

FIG. 3 illustrates a flowchart of a method of managing the user interface. In an example embodiment, the method is performed by execution of computer-readable software program codes or instructions using the first processor 12 of the in-vehicle device 1.

Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S301.

At block S301, the determining module 201 determines whether the in-vehicle device 1 is in communication with the handheld device 2. When the in-vehicle device 1 is not in communication with the handheld device 2, the process goes to block S302. When the in-vehicle device 1 is in communication with the handheld device 2, the process goes to block S303.

In this embodiment, when the first wireless communication device 15 of the in-vehicle device 1 establishes a communication connection with the first wireless communication device 25 of the handheld device 2, the determining module 201 can detect wireless communication connection signals from the first wireless communication device 15. Such that the determining module 201 can determine that the in-vehicle device 1 is in communication with the handheld device 2 when the wireless communication connection signals are detected from the first wireless communication device 15.

Similarly, when the first wired communication device 16 of the in-vehicle device 1 establishes a communication connection with the second wired communication device 26 of the handheld device 2, wired communication connection signals can be detected from the first wired communication device 16, such that the determining module 201 can determine that the in-vehicle device 1 is in communication with the handheld device 2 when the wired communication connection signals are detected from the first wired communication device 16.

At block S302, when the in-vehicle device 1 is not in communication with the handheld device 2, the display module 202 displays related information of the in-vehicle device 1 on a first user interface 3.

Figure 4A:
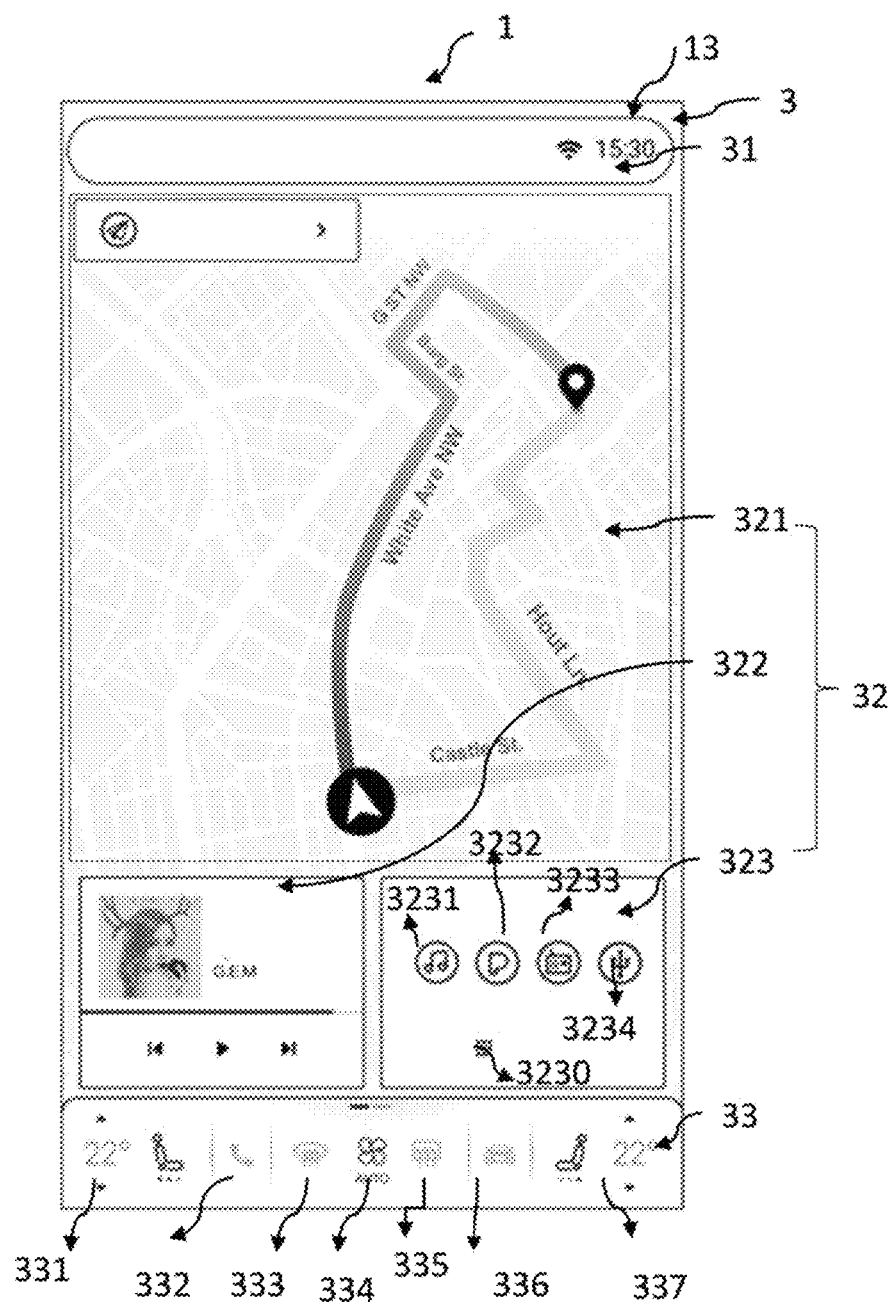
FIG. 4A illustrates a diagram of a first embodiment of displaying related information of the in-vehicle device using a first user interface when the in-vehicle device and the handheld device are not in communication.

In one embodiment, referring to FIG. 4A, the first user interface 3 includes a first status display area 31, a first main display area 32, and a first function control column 33.

In one embodiment, the first status display area 31 is located above the first main display area 32, and the first function control column 33 is located below the first main display area 32. An area of the first main display area 32 is larger than an area of the first status display area 31. The area of the first main display area 32 is also larger than an area of the first function control column 33.

In one embodiment, the first status display area 31 is used to display system time, a signal strength of a wireless communication of the in-vehicle device 1, and other related information of the in-vehicle device 1.

In one embodiment, the first function control column 33 is used to display function buttons of the in-vehicle device 1. For example, as shown in FIG. 4A, function buttons can include, but is not limited to, a setting button 331 for setting air conditioning temperature of front seats of the vehicle 100, a button 332 for making a call, a first button 333 for defogging, a button 334 for adjusting a fan of the vehicle 100, a second button 335 for defogging, a button 336 for controlling related function of the vehicle 100, and a setting button 337 for setting air conditioning temperature of rear seats of the vehicle 100.

In one embodiment, in the first function control column 33, a brightness value of the function button which is currently in an active state is higher than a brightness value of the function button which is currently in an inactive state.

In other embodiments, in the first function control column 33, a color of the function button which is currently in the active state is different from a color of the function button which is currently in the inactive state.

In one embodiment, the display module 202 can divide the first main display area 32 into a plurality of sub-areas. In an embodiment, the plurality of sub-areas can be respectively used to display user interfaces of different applications of the in-vehicle device 1.

In one embodiment, the display module 202 can divide the first main display area 32 into the plurality of sub-areas in response to user input.

In an embodiment, the display module 202 can predefine different user operations corresponding to different preset number of sub-areas. That is to say, when a user input is received by the display module 202, the display module 202 can determine the preset number of sub-areas corresponding to the received user input. The display module 202 then divides the first main display area 32 into the determined preset number of sub-areas. In one embodiment, a size of each of the plurality of sub-areas can be preset by the display module 202.

For example, the display module 202 predefines three user operations respectively corresponding to different preset number of sub-areas, the three user operations includes a first user operation, a second user operation, and a third user operation, the first user operation being corresponding to three sub-areas, the second user operation being corresponding to four sub-areas, and the third user operation being corresponding to five sub-areas. The first user operation can be an operation of two fingers of a user sliding simultaneously on the first main display area 32 and a distance between the two fingers gradually increases. The second user operation can be an operation of three fingers of the user sliding simultaneously on the first main display area 32 and a distance between each two of the three fingers gradually increases from each other. The third user operation can be an operation of four fingers of the user slide simultaneously on the first main display area 32 and a distance between each two of the four fingers increases gradually. When the display module 202 detects the first user operation, the display module 202 divides the first main display area 32 into three sub-areas. When the display module 202 detects the second user operation, the display module 202 divides the first main display area 32 into four sub-areas. When the display module 202 detects the third user operation, the display module 202 divides the first main display area 32 into five sub-areas.

In one embodiment, the display module 202 can also specify content displayed in each of the plurality of sub-areas in response to user input.

For example, when the display module 202 detects a long press signal (for example, pressing for more than 5 seconds) from one of the plurality of sub-areas, the display module 202 provides a plurality of applications for a user to select, the display module 202 can display, in the one of the plurality of sub-area, a user interface of one of the plurality of applications which is selected by the user. The long press signal can be defined to be a signal that is generated by pressing the first display 13 for more than five seconds.

To clearly describe the present disclosure, in this embodiment, the plurality of sub-areas include a first display sub-area 321, a second display sub-area 322, and a third display sub-area 323.

In an embodiment, the first display sub-area 321 can be used to display the navigation interface of the first navigation application 17. For example, the first display sub-area 321 can be used to display a geographic location in which the vehicle 100 is currently located, a destination location, a suggested navigation route, and alternative navigation routes, etc. The second display sub-area 322 can be used to display a video/audio interface of the first music application 18. For example, the second display sub-area 322 can be used to display a music name currently played or to be played by the first music application 18, a cover picture corresponding to the currently played or to be played music, and the like. The third display sub-area 323 can be used to display user interfaces corresponding to other applications of the in-vehicle device 1 or can be used to display icons of various applications used by the in-vehicle device 1 within a preset time period (for example, in the last week).

For example, referring to FIG. 4A, the third display sub-area 323 can be used to display an icon 3231 of the first music application 18 that has been run by the in-vehicle device 1 in the last week, an icon 3232 corresponding to the parking function, an icon 3233 corresponding to the radio function, and an icon 3234 corresponding to the USB connection function.

In one embodiment, the third display sub-area 323 can also display a specific icon 3230. The specification icon 3230 can be used to trigger the display module 202 to display icons of all applications of the in-vehicle device 1. For example, when the display module 202 receives a touch signal generated by touching the specific icon 3230, the display module 202 can display icons of all the applications of the in-vehicle device 1.

In one embodiment, when the display module 202 has divided the first main display area 32 into the plurality of sub-areas (such as the first display sub-area 321, the second display sub-area 322, and the third display sub-area 323), the display module 202 can further determine one of the plurality of sub-areas as a target area in response to a specified signal, the one of the plurality of sub-areas is an area in which the specified signal is received by the display module 202. The display module 202 can determine the content currently displayed in the target area as target content. The display module 202 can further merge the plurality of sub-areas into one area in response to the specified signal such that a merged area is obtained (the merged area is the first main display area 32). The display module 202 can also hide or close content currently displayed in other sub-areas other than the target area among the plurality of sub-areas. The display module 202 can also display the target content and/or other contents related to the target content in the merged area. In one embodiment, the display module 202 enlarges the target content and displays the enlarged content in the merged area.

In an embodiment, when the display module 202 merges the plurality of sub-areas into the merged area in response to the specified signal, the display module 202 maintains sizes, positions, and shapes of the first status display area 31 and the first function control column 33 unchanged.

In a first embodiment, the specified signal is a first signal, and the first signal can be a signal received from the first display sub-area 321 (e.g., a sliding signal generated by sliding from left to right or from right to left for a preset distance in the first display sub-area 321), or a signal generated by rotating a first designated knob (not shown) on the in-vehicle device 1, or a signal generated by pressing the first designated button.

In an embodiment, the display module 202 can establish a relationship between the first signal and the first display sub-area 321, such that when the first signal is received by the display module 202, the display module 202 can determine that the first display sub-area 321 as the target area, and determine the content currently displayed in the target area as the target content. The display module 202 can further merge the plurality of sub-areas (i.e., the first display sub-area 321, the second display sub-area 322, and the third display sub-area 323) into one area, and obtains the merged area (the merged area is the first main display area 32, that is, the first main display area 32 is not divided into the plurality of sub-areas). The display module 202 also hides or closes content displayed in other sub-areas (i.e., the second display sub-area 322 and the third display sub-area 323) other than the target area (i.e., the first display sub-area 321) among the plurality of sub-areas. The display module 202 displays the target content and/or other content related to the target content in the merged area.

In one embodiment, the other content related to the target content includes a shortcut bar of the in-vehicle device 1.

In one embodiment, the display module 202 displays the shortcut bar of the in-vehicle device 1 together with detailed information corresponding to one of shortcut tools of the shortcut bar. In one embodiment, the one of the shortcut tools can be a shortcut tool located first in the shortcut bar.

Figure 4B:
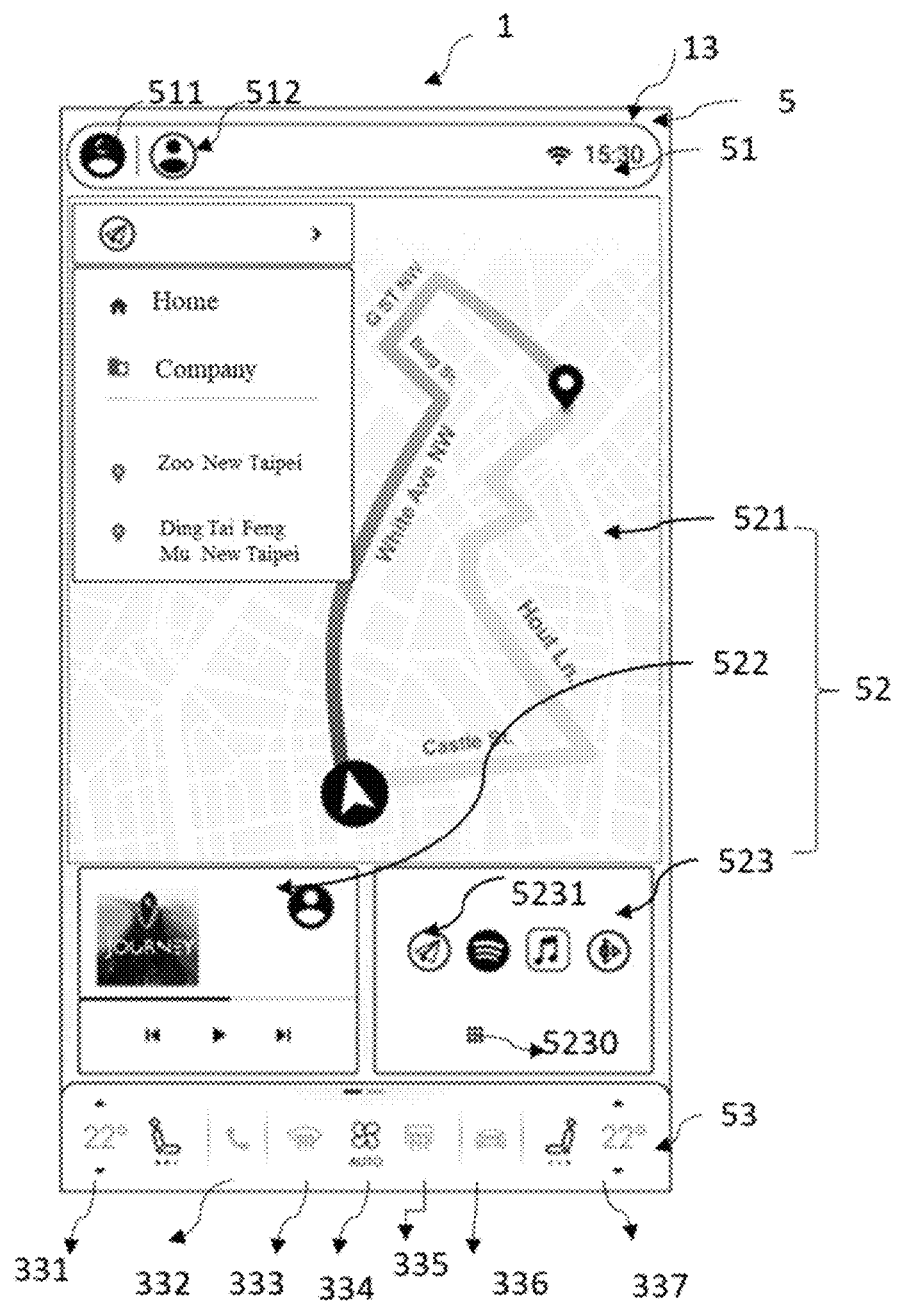
FIG. 4B illustrates a diagram of the first embodiment of displaying related information of the in-vehicle device and related information of the handheld device using a second user interface when the in-vehicle device and the handheld device are in communication.
Figure 4C:
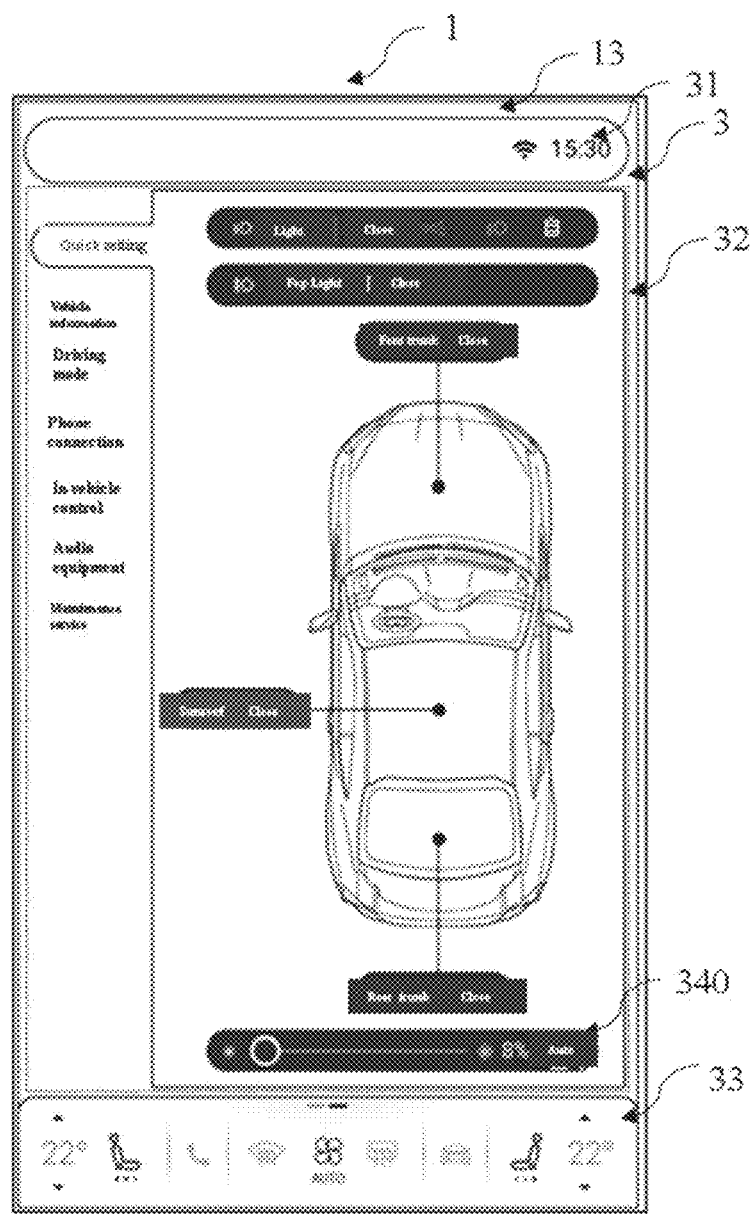
FIG. 4C illustrates a diagram of displaying the related information of the in-vehicle device in a merged area when a plurality of sub-areas are merged into the merged area.

For example, as shown in FIG. 4C, when the display module 202 receives the first signal, the display module 202 merges the first display sub-area 321, the second display sub-area 322, and the third display sub-area 323 into one area, and obtain a merged area (the merged area is the first main display area 32, that is, the first main display area 32 is not divided into a plurality of sub-areas). The display module 202 displays the shortcut bar of the in-vehicle device 1 in the merged area. The shortcut bar includes shortcut tools such as "Quick settings", "Vehicle information", "Driving mode", "Phone connection", "In-vehicle control", "Audio equipment", "Maintenance service" and other shortcut tools. The display module 202 also displays detailed information corresponding to the shortcut tool located in a first position of the shortcut bar, i.e., displays detailed information corresponding to "quick setting". For example, the display module 202 can display the detailed information corresponding to "quick setting" including a state of a headlight of the vehicle 100, a state of a fog lamp of the vehicle 100, a state of a rear trunk of the vehicle 100, a state of a front trunk of the vehicle 100, a state of a sunroof of the vehicle 100, and a control column 340 for adjusting brightness of the first display 13. The control column 340 is strip-shaped.

In an embodiment, when the display module 202 receives a touch signal from one of the shortcut tools in the shortcut bar, the display module 202 displays detailed information of one of the shortcut tools in the merged area. For example, when the display module 202 receives the touch signal generated by touching the shortcut tool "audio equipment", the display module 202 displays detailed information of the shortcut tool "audio equipment" such as a volume level in the merged area.

In a second embodiment, the specified signal is a second signal, and the second signal can be a signal received from the second display sub-area 322 (e.g., a signal generated by pressing in the second display sub-area 322 exceeding a preset duration), or a signal generated by rotating a second designated knob (not shown) on the in-vehicle device 1, or a signal generated by pressing the second designated knob.

In an embodiment, the display module 202 can establish a relationship between the second signal and the second display sub-area 322. When the second signal is received by the display module 202, the display module 202 can determine the second display sub-area 322 as a target area, and determine content currently displayed in the target area as target content. The display module 202 can further merge the plurality of sub-areas (i.e., the first display sub-area 321, the second display sub-area 322, and the third display sub-area 323) into one area, and obtain a merged area (the merged area is the first main display area 32, that is, the first main display area 32 is not divided into a plurality of areas). The display module 202 further hides or closes contents displayed in other sub-areas (i.e., the first display sub-area 321 and the third display sub-area 323) other than the target area (i.e., the second display sub-area 322) among the plurality of sub-areas, and displays the target content and/or other content related to the target content in the merged area.

In an embodiment, the other content related to the target content includes: icons corresponding to video/audio applications that the in-vehicle device 1 ever executed within a preset time period (for example, in the last week), cover pages corresponding to video/audio files played by the in-vehicle device 1 within the preset time period (for example, in the last week), and a cover corresponding to a list of favorite songs of the in-vehicle device 1.

It should be noted that the favorite songs mentioned in the present disclosure can be defined to be songs each has been marked using a mark. For example, when the in-vehicle device 1 receives a predetermined signal corresponding to a first song, the in-vehicle device 1 can mark the first song as the favorite song. The predetermined signal corresponding to the first song can be a signal generated by touching a name of the first song that is displayed on the first display screen 13.

Figure 5A:
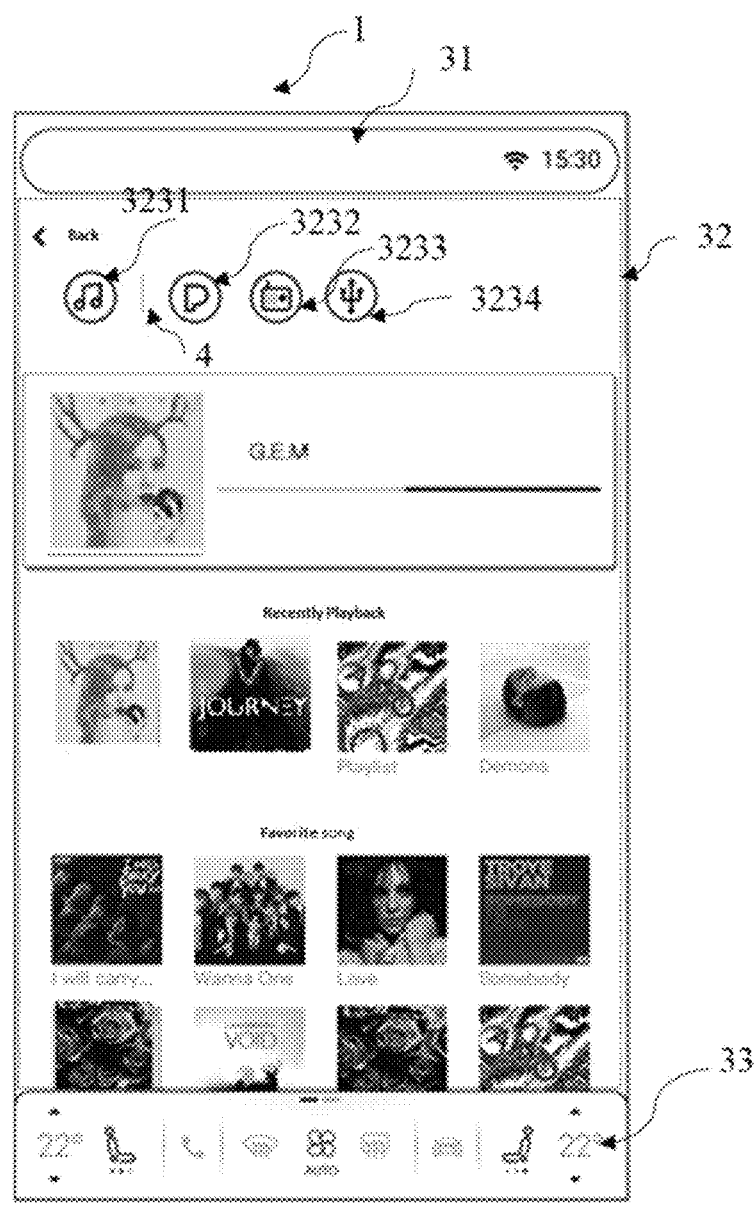
FIG. 5A illustrates a diagram of a second embodiment of displaying the related information of the in-vehicle device using the first user interface when the in-vehicle device and the handheld device are not in communication.

For example, as shown in FIG. 5A, when the display module 202 receives the second signal, the display module 202 can determine the second display sub-area 322 as a target area, and determine content currently displayed in the target area as target content. The display module 202 further merges the first display sub-area 321, the second display sub-area 322, and the third display sub-area 323 into one area, and obtain a merged area (the merged area is the first main display area 32, that is, the first main display area 32 is not divided into a plurality of areas). The display module 202 further displays, in the merged area, the target content (such as a name of a currently played music, a cover picture corresponding to a currently played music, a play progress), the icons (such as an icon 3231 corresponding to the first music application 18, an icon 3232 corresponding to an application "Pandora", an icon 3233 corresponding to a radio application, an icon 3234 corresponding to a USB connection application) corresponding to video/audio applications that the in-vehicle device 1 ever executed within the preset time period, the cover pages corresponding to the video/audio files played by the in-vehicle device 1 within the preset time period (for example, in the last week), and the cover corresponding to the list of favorite songs of the in-vehicle device 1.

In an embodiment, the display module 202 can display the icons corresponding to video/audio applications that the in-vehicle device 1 ever executed within the preset time period according to a state of each of video/audio applications. In at least one embodiment, a brightness value of the icon corresponding to the video/audio application which is in an active state is greater than a brightness value of the icon corresponding to the video/audio application which is in an inactive state.

In an embodiment, the display module 202 can arrange the icons corresponding to video/audio applications that the in-vehicle device 1 ever executed within the preset time period according to the state of each of video/audio applications. In at least one embodiment, the icon corresponding to the video/audio application which is in the active state is arranged in front of the icon corresponding to the video/audio application which is in the inactive state.

In an embodiment, the display module 202 further arranges the icons corresponding to the applications that are in the active state according to initial execution time of each of the applications that are in the active state. In an embodiment, the display module 202 randomly arranges the icons corresponding to the applications that are currently in the inactive state, or arranges the icons corresponding to the applications that are currently in the inactive state according to termination execution time corresponding to the applications that are currently in the inactive state. For example, the display module 202 can rank one of the icons in the first, the one of the icons is corresponding to an application currently in the inactive state and having a latest termination execution time.

For example, as shown in FIG. 5A, the display module 202 can rank the icon 3232 in the first, the icon corresponding to the application "Pandora" is currently in the inactive state and having the latest termination execution time.

In this embodiment, the initial execution time of each application that is currently in the active state can be defined to be the time when each application is initialized in the latest. The termination execution time of each application that is currently in the inactive state can be defined to be the time when each application is ended in the latest.

In one embodiment, the display module 202 can also use a line to distinguish the icons corresponding to the applications that are currently in the active state from the icons corresponding to the applications that is currently in the inactive state.

For example, referring to FIG. 5A, the display module 202 uses the line 4 to distinguish the icon 3231 corresponding to the first music application 18 currently in the active state from the icons corresponding to other applications currently in the inactive state (For example, the icon 3232 corresponding to the "Pandora" application).

In a third embodiment, the specified signal is a third signal, and the third signal can be a signal received from the third display sub-area 323 (e.g., a signal generated by pressing/touching the specific icon 3230 in the third display sub-area 323). The third signal can also be a signal generated by rotating a third designated knob (not shown) on the in-vehicle device 1, or a signal generated by pressing the third designated knob.

It should be noted that the first designated knob, the second designated knob, and the third designated knob are different from each other.

In an embodiment, the display module 202 can establish a relationship between the third signal and the third display sub-area 321, so that when the third signal is received by the display module 202, the display module 202 can determine the third display sub-area 323 as a target area, and determine the content currently displayed in the target area as target content. The display module 202 can further merge the plurality of sub-areas (such as the first display sub-area 321, the second display sub-area 322, and the third display sub-area 323) into one area, and obtain a merged area (the merged area is the first main display area 32, that is, the first main display area 32 is not divided into a plurality of areas). The display module 202 also hides or closes contents displayed in other sub-areas (i.e., the first display sub-area 321 and the second display sub-area 322) other than the target area (i.e., the third display sub-area 323) among the plurality of sub-areas. The display module 202 can further display the target content and/or other content related to the target content in the merged area.

Figure 6A:
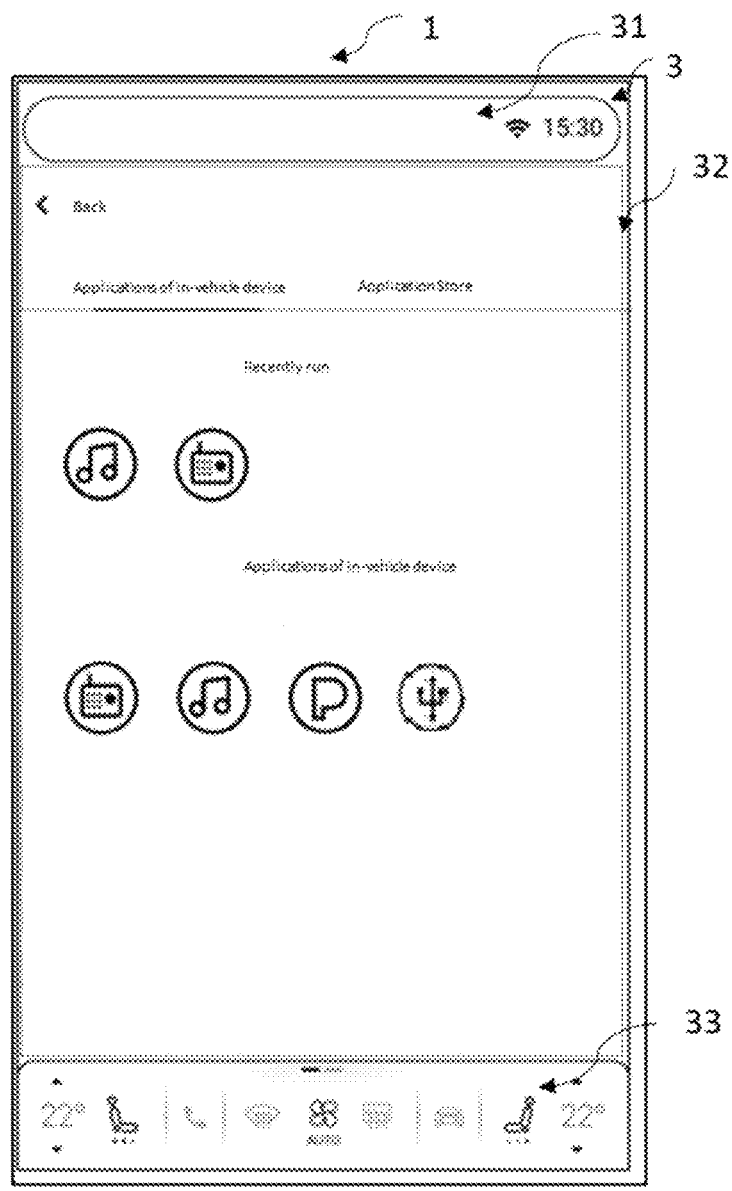
FIG. 6A illustrates a diagram of a third embodiment of displaying related information of the in-vehicle device using the first user interface when the in-vehicle device and the handheld device are not in communication.

In one embodiment, the other content related to the target content includes icons corresponding to all applications of the in-vehicle device 1. For example, when the display module 202 receives the third signal, the display module 202 can determine the third display sub-area 323 as a target area, and determine the content currently displayed in the target area as target content. Referring to FIG. 6A, the display module 202 can further merges the first display sub-area 321, the second display sub-area 322, and the third display sub-area 323 into one area, and obtain a merged area (the merged area is the first main display area 32, that is, the first main display area 32 is not divided into a plurality of areas). The display module 202 can further display the target content, and the icons corresponding to all applications of the in-vehicle device 1 in the merged area.

In an embodiment, the display module 202 can display the icons corresponding to all the applications of the in-vehicle device 1 randomly or in a preset order in the merged area. In one embodiment, the preset order can be an order of installation time of each application installed in the in-vehicle device 1.

In an embodiment, referring to FIG. 6A, the display module 202 can display icons corresponding to applications that the in-vehicle device 1 ever executed within the preset time period (for example, in the last week) in a first list, and can display the icons corresponding to all applications of the in-vehicle device 1 in a second list.

At block S303, when the in-vehicle device 1 is in communication with the handheld device 2, the execution module 203 acquires, from the handheld device 2, an authority of accessing related information of the handheld device 2. The execution module 203 further obtains the related information of the handheld device 2 when the authority is acquired.

In an embodiment, when the in-vehicle device 1 is in communication with the handheld device 2, the execution module 203 can send a request for acquiring the authority to the handheld device 2. The handheld device 2 can determine whether or not to allow the handheld device 2 to obtain the authority according to a confirmation operation of a user when the request is received. For example, the handheld device 2 can display a dialog box on the second display screen 23 of the handheld device 2 after receiving the request to ask the user whether or not to authorize the in-vehicle device 1 to access the related information of the handheld device 2.

In an embodiment, the execution module 203 acquires the related information of the handheld device 2 according to the related information of the in-vehicle device 1 displayed in the first user interface.

Specifically, when the first display sub-area 321 included in the first main display area 32 displays the navigation interface of the first navigation application 17, the execution module 203 acquires the navigation data of the second navigation application 27. In one embodiment, the navigation data of the second navigation application 27 includes a destination that the second navigation application 27 ever navigated to within a preset time period (e.g., in the last week).

In an embodiment, when the second display sub-area 322 included in the first main display area 32 displays the music playing interface of the first music application 18, the executing module 203 acquires the video/audio data of the second music application 28 of the handheld device 2. In one embodiment, the video/audio data of the second music application 28 includes a recently played music and a playing progress of the recently played music, an identifier of a user who logs into the second music application 28, video/audio applications files played by the handheld device 2 within a preset time period (For example, in the last week), a cover page corresponding to the video/audio file played by the handheld device 2 within the preset time period (for example, in the last week), and a list of favorite songs of the handheld device 2.

It should be noted that the favorite songs mentioned in the present disclosure can be defined to be songs each has been marked using a mark. For example, when the handheld device 2 receives a predetermined signal corresponding to a second song, the handheld device 2 can mark the second song as the favorite song. The predetermined signal corresponding to the second song can be a signal generated by touching a name of the second song that is displayed on the second display screen 23.

In an embodiment, when the third display sub-area 323 included in the first main display area 32 displays icons that the in-vehicle device 1 ever run within a preset time period (for example, within the last week), the execution module 203 acquires icons corresponding to the applications that the handheld device 2 has run in the preset time period.

In one embodiment, when the third display sub-area 323 further displays the specific icon 3230 for triggering the in-vehicle device 1 to display icons of all applications of the in-vehicle device 1, the execution module 203 also acquires icons of all applications of the handheld device 2

In one embodiment, the related information of the handheld device 2 further includes an identification of a user who logs into the handheld device 2 within a preset time period (e.g., in the last week).

At block S304, the display module 202 displays the related information of the in-vehicle device 1 and the related information of the handheld device 2 on a second user interface 5.

In one embodiment, on the second user interface 5, a color and/or a shape of the related information of the in-vehicle device 1 is different from a color and/or a shape of the related information of the handheld device 2.

FIG. 4B illustrates a diagram of displaying the related information of the in-vehicle device 1 and the related information of the handheld device 2 on the second user interface 5, after the communication connection between the in-vehicle device 1 and the handheld device 2 is established.

In one embodiment, the second user interface 5 includes a second status display area 51, a second main display area 52, and a second function control column 53.

In one embodiment, the second status display area 51 is located above the second main display area 52, and the second function control column 53 is located below the second main display area 52. An area of the second main display area 52 is larger than an area of the second status display area 51. An area of the second main display area 52 is larger than an area of the second function control column 53.

In one embodiment, the second status display area 51 has a same size and a same shape as the first status display area 31, and a position of the second status display area 51 on the first display screen 13 is same as a position of the first status display area 31 on the first display screen 13. The second main display area 52 has the same size and same shape as the first main display area 32, and the position of the second main display area 52 on the first display screen 13 is same as the position of the first main display area 32 on the first display screen 13. The second function control column 53 has the same size and same shape as the first function control column 33, and the position of the second function control column 53 on the first display screen 13 is the same as the position of the first function control column 33 on the first display screen 13.

In an embodiment, the second status display area 51 is used to display the system time of the in-vehicle device 1, the signal strength of the wireless communication of the in-vehicle device 1, and the identification of each of users logged into the handheld device 2 within a preset time period (e.g., during the most recent week).

For example, referring to FIG. 4B, the display module 202 displays, in second status display area 51, the system time of the in-vehicle device 1, the signal strength of the wireless communication of the in-vehicle device 1, and the user 511 and the user 512 that logged into the handheld device 2 in the last week.

In an embodiment, the display module 202 also synchronizes the list of favorite songs of the users who logged into the handheld device 2 to the in-vehicle device 1.

It should be noted that, the handheld device 2 can establish a relationship between the list of favorite songs and the user who logged into the handheld device 2.

For example, when the handheld device 2 receives a predetermined signal corresponding to a certain song that is currently played by the handheld device 2, the handheld device 2 can mark the certain song as the favorite song, and can further establish a relationship between the certain song and the user who currently logs into the handheld device 2. The predetermined signal corresponding to the certain song can be defined to be a signal that is generated by touch a name of the certain song that is displayed on the second display screen 23.

In one embodiment, a brightness value of the identifier of the user currently in a login status is greater than a brightness value of the identifier of the user who ever logged into the handheld device 2 in the preset time period but is currently in a logout status.

In an embodiment, the content displayed in the second function control column 53 is the same as the content displayed in the first function control column 53. For example, the second function control column 53 can also be used to display function buttons of the in-vehicle device 1, such as the setting button 331 for setting air conditioning temperature of front seats of the vehicle 100, the button 332 for making a call, the first button 333 for defogging, the button 334 for adjusting a fan of the vehicle 100, the second button 335 for defogging, the button 336 for controlling related function of the vehicle 100, and the setting button 337 for setting air conditioning temperature of rear seats of the vehicle 100.

In one embodiment, in the second function control column 53, the brightness value of the function button currently in the active state is higher than the brightness value of the function button currently in the inactive state.

In one embodiment, the display module 202 can divide the second main display area 52 into a plurality of sub-areas. The plurality of sub-areas includes a fourth display sub-area 521, a fifth display sub-area 522, and a sixth display sub-area 523.

In one embodiment, the fourth display sub-area 521 has the same shape and same size as the first display sub-area 321, and the position of the fourth display sub-area 521 in the second main display area 52 is same as the position of the first display sub-area 321 in the first main display area 32. The fifth display sub-area 522 and the second display sub-area 322 have the same shape and size, and the position of the fifth display sub-area 522 in the second main display area 52 is same as the position of the second display sub-area 322 in the first main display area 32. The sixth display sub-area 523 has the same shape and size as the third display sub-area 323, and the position of the sixth display sub-area 523 in the second main display area 52 is same as the position of the third the sub display area 323 in the first main display area 32.

In an embodiment, the plurality of sub-areas can be respectively used to display user interfaces of different applications. In an embodiment, the fourth display sub-area 521 can be used to display the navigation interface of the first navigation application 17. For example, the fourth display sub-area 521 can be used to display the geographic location in which the vehicle 100 is currently located, the destination location of the first navigation application 17, the suggested navigation route, and alternative navigation routes, etc. The display module 202 also displays the navigation data of the second navigation application 27 in the fourth display sub-area 521, for example, a destination that the second navigation application 27 ever navigated to within the preset time period (for example, in the last week).

In an embodiment, when the execution module 203 acquired video/audio data of the second music application 28 from the handheld device 1, as long as the second music application 28 of the handheld device 2 is currently in the active state, regardless of the first music application 18 of the in-vehicle device 1 is currently in the active state or in the inactive state, the display module 202 turns off the first music application 18, and displays the video/audio interface of the second music application 28 in the fifth display sub-area 522. For example, the display module 202 displays, in the fifth display sub-area 522, the name of the music currently played by the second music application 28, the cover picture corresponding to the currently played music, the playing progress of the currently played music, and the like.

In an embodiment, the display module 202 displays, in the sixth display sub-area 523, first icons of applications that the in-vehicle device 1 has operated within the preset time period (for example, in the last week), and second icons of the applications that the handheld device 2 has operated in the preset time period.

In an embodiment, the display module 202 can arrange the first and the second icons, according to termination execution time of each application corresponding to each of the first and second icons. For example, the display module 202 can arrange the icon 5231 corresponding to a certain application whose termination execution time is the latest to be at the forefront.

In this embodiment, the termination execution time corresponding to each application can be defined to be the time when each application is ended in the latest.

In an embodiment, the display module 202 further displays a specific icon 5230 in the sixth display sub-area 523, the specific icon 5230 is used to trigger the display module 202 to display icons of all applications of the in-vehicle device 1 and the handheld device 2. For example, when the display module 202 receives a touch signal generated by touching the specific icon 5230, the display module 202 can display icons of all applications of the in-vehicle device 1 and the handheld device 2.

In an embodiment, the display module 202 can first classify the icons of all the applications of the in-vehicle device 1 and the handheld device 2 according to a frequency of use of each icon; and then display the classified icons. In other embodiments, the display module 202 can first classify the icons of all the applications of the in-vehicle device 1 and the handheld device 2 according to an attribute of each icon; and then display the classified icons.

For example, the display module 202 can classify the icons of the applications each of which the frequency of use is greater than a preset value into a first group, classify icons of the applications each of which the frequency of use is less than or equal to the preset value into a second group; the display module 202 then respectively display the first group and the second group in different positions.

For another example, the display module 202 can classify the icons corresponding to the applications related to the catering into a third group, and classify the icons corresponding to the applications related to game into a fourth group; the display module 202 then respectively display the third group and the fourth group in different positions.

In one embodiment, when the display module 202 has divided the second main display area 52 into a plurality of sub-areas (for example, dividing the second main display area 52 into the fourth display sub-area 521, the fifth display sub-area 522 and the sixth display sub-area 523), the display module 202 can determine one of the plurality of sub-areas as a target area when a predetermined signal is received from the one of the plurality of sub-areas. The one of the plurality of sub-areas can be any one of the plurality of sub-areas. The display module 202 can further determine the content currently displayed in the target area as target content. The display module 202 can further merge the plurality of sub-areas into one area in response to the predetermined signal, and obtain a merged area (the merged area is the second main display area 52, that is, the second main display area 52 is not divided into the plurality of areas). The display module 202 can also hide or close content displayed in other sub-areas other than the target area among the plurality of sub-areas. The display module 202 can further display the target content and/or other content related to the target content in the merged area. In one embodiment, the display module 202 enlarges the target content and displays the enlarged content in the merged area.

In an embodiment, the display module 202 can merge the plurality of sub-areas into one area in response to the predetermined signal, and can un-change the sizes, positions, and shapes of the second status display area 51 and the second function control column 53.

In a first embodiment, the predetermined signal is a fourth signal, and the fourth signal can be a signal received from the fourth display sub-area 521 (for example, a signal generated by sliding from the left to right in the fourth display sub-area 521 for a predetermined distance such as 2 cm), or a signal generated by rotating the first designated knob on the in-vehicle device 1, or a signal generated by pressing the first designated knob.

In an embodiment, the display module 202 can establish a relationship between the fourth signal and the fourth display sub-area 521, so that when the fourth signal is received by the display module 202, the display module 202 can determine the fourth display sub-area 521 as the target area, and determine the content currently displayed in the target area as target content. The display module 202 can further merge the plurality of sub-areas (such as the fourth display sub-area 521, the fifth display sub-area 522, and the sixth display sub-area 523) into one area, and obtain a merged area (the merged area is the second main display area 52, that is, the second main display area 52 is not divided into a plurality of areas). The display module 202 can further hide or close contents displayed in other sub-areas (i.e., the fifth display sub-area 522 and the sixth sub display area 523) other than the target area (i.e., the fourth display sub-area 521) among the plurality of sub-areas, and display the target content and/or other content related to the target content in the merged area.

In one embodiment, the other content related to the target content includes a shortcut bar of the in-vehicle device 1.

In one embodiment, the display module 202 displays the shortcut bar of the in-vehicle device 1 together with detailed information of one of shortcut tools of the shortcut bar. In one embodiment, the one of the shortcut tools can be a shortcut tool located first in the shortcut bar.

In a second embodiment, the predetermined signal can be a fifth signal, and the fifth signal can be a signal received from the fifth display sub-area 522 (for example, a signal generated by pressing any position of the fifth display sub-area 522 exceeding a preset duration, for example, 3 seconds), or a signal generated by rotating the second designated knob on the in-vehicle device 1, or a signal generated by pressing the second designated knob.

In an embodiment, the display module 202 can establish a relationship between the fifth signal and the fifth display sub-area 522, so that when the fifth signal is received by the display module 202, the display module 202 can determine the fifth display sub-area 522 as the target area, and determine the content currently displayed in the target area as target content. The display module 202 can further merge the plurality of sub-areas (such as the fourth display sub-area 521, the fifth display sub-area 522, and the sixth display sub-area 523) into one area, and obtain a merged area (the merged area is the second main display area 52, that is, the second main display area 52 is not divided into a plurality of areas). The display module 202 can further hide or close content displayed in other sub-areas (i.e., the fourth display sub-area 521 and the sixth sub display area 523) other than the target area (i.e., the fifth display sub-area 522), and can display the target content and/or other content related to the target content in the merged area.

In an embodiment, the other content related to the target content includes: icons corresponding to video/audio applications that the in-vehicle device 1 ever executed within a preset time period (for example, in the last week), cover pages corresponding to video/audio files played by the in-vehicle device 1 within the preset time period (for example, in the last week), and a cover corresponding to a list of favorite song of the in-vehicle device 1; and the icons corresponding to the video/audio applications that the handheld device 2 ever executed within the preset time period, and cover pages corresponding to video/audio files played by the handheld device 2 within the preset time period, and a cover corresponding to a list of favorite songs of the handheld device 2.

Figure 5B:
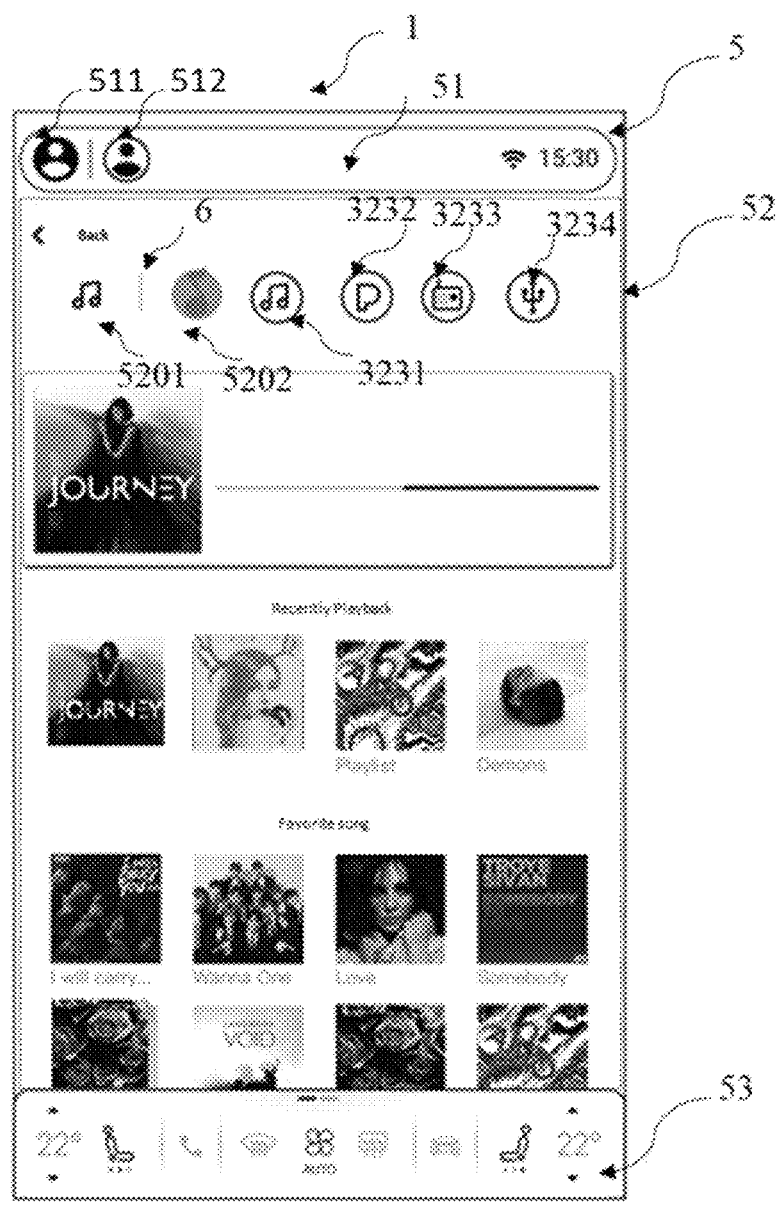
FIG. 5B illustrates a diagram of the second embodiment of displaying the related information of the in-vehicle device and the related information of the handheld device using the second user interface when the in-vehicle device and the handheld device are in communication.

For example, referring to FIG. 5B, when the display module 202 receives the fifth signal, the display module 202 can determine the fifth sub display area 522 as the target area, and the content current displayed in the fifth sub display area 522 as the target content. The display module 202 can further merge the plurality of display sub-areas (i.e., the fourth display sub-area 521, the fifth display sub-area 522, and the sixth display sub-area 523) into one area, and obtain a merged area (the merged area is the second main display area 52, that is, the second main display area 52 is not divided into a plurality of areas).

The display module 202 can further display, in the merged area, the target content (such as the currently played music name, the cover picture corresponding to the currently played music, and the play progress), the icons (such as the icon 3231 corresponding to the first music application 18, the icon 3232 corresponding to the application "Pandora", the icon 3233 corresponding to the radio application, the icon 3234 corresponding to the USB connection application) corresponding to video/audio applications that the in-vehicle device 1 ever executed within the preset time period (e.g., in last week), the cover pages corresponding to the video/audio files played by the in-vehicle device 1 within the preset time period (for example, in the last week), and the cover corresponding to the list of favorite songs of the in-vehicle device 1, and the icons (such as the icon 5201 corresponding to the second music application 28, the icon 5202 corresponding to other music application) corresponding to the video/audio applications that the handheld device 2 ever executed within the preset time period, and cover pages corresponding to video/audio files played by the handheld device 2 within the preset time period, and a cover corresponding to a list of favorite songs of the handheld device 2.

In one embodiment, the display module 202 can display the icons corresponding to video/audio applications that the in-vehicle device 1 ever executed within the preset time period, and the icons corresponding to video/audio applications that the handheld device 2 ever executed within the preset time period, according to a state of each of the video/audio applications. In at least one embodiment, a brightness value of the icon corresponding to the video/audio application which is in the active state is greater than a brightness value of the icon corresponding to the video/audio application which is in the inactive state.

In other embodiments, the display module 202 can display the icons corresponding to video/audio applications that the in-vehicle device 1 ever executed within the preset time period, and the icons corresponding to video/audio applications that the handheld device 2 ever executed within the preset time period, according to the state of each of the video/audio applications. In at least one embodiment, a color of the icon corresponding to the video/audio application which is in the active state is different from a color of the icon corresponding to the video/audio application which is in the inactive state.

In an embodiment, the display module 202 can arrange the icons corresponding to video/audio applications that the in-vehicle device 1 ever executed within the preset time period, and the icons corresponding to video/audio applications that the handheld device 2 ever executed within the preset time period, according to the state of each of video/audio applications. In at least one embodiment, the icon corresponding to the video/audio application which is in the active state is arranged in front of the icon corresponding to the video/audio application which is in the inactive state.

In an embodiment, the display module 202 further arranges the icons corresponding to the applications that are in the active state according to initial execution time of each of the applications that are in the active state. In an embodiment, the display module 202 randomly arranges the icons corresponding to the applications that are currently in the inactive state, or arranges the icons corresponding to the applications that are currently in the inactive state according to termination execution time corresponding to the applications that are currently in the inactive state. For example, the display module 202 can rank one of the icons in the first, the one of the icons is corresponding to an application currently in the inactive state and having a latest termination execution time.

In one embodiment, the display module 202 can also use a line 6 to distinguish the icons corresponding to the applications that are currently in the active state from the icons corresponding to the applications that is currently in the inactive state.

In a third embodiment, the predetermined signal is a sixth signal, and the sixth signal can be a signal received from the sixth display sub-area 523 (e.g., a signal generated by pressing/touching the specific icon 3230 in the sixth display sub-area 523), or a signal generated by rotating the third designated knob on the in-vehicle device 1, or pressing the third designated knob.

In an embodiment, the display module 202 can establish a relationship between the sixth signal and the sixth display sub-area 321, so that when the sixth signal is received by the display module 202, the display module 202 can determine the sixth display sub-area 523 as a target area, and can determine content currently displayed in the target area as target content. The display module 202 can further merge the plurality of sub-areas (such as the fourth display sub-area 521, the fifth display sub-area 522, and the sixth display sub-area 523) into one area, and obtain a merged area (the merged area is the second main display area 52, that is, the second main display area 52 is not divided into a plurality of sub-areas). The display module 202 can further hide or close content displayed in other sub-areas (i.e., the fourth display sub-area 521 and the fifth display sub-area 522) other than the target area (i.e., the sixth display sub-area 523) among the plurality of sub-areas, and display the target content and/or other content related to the target content in the merged area.

In an embodiment, the other content related to the target content includes icons corresponding to all applications of the in-vehicle device 1 and icons corresponding to all applications of the handheld devices 2.

For example, when the display module 202 receives the sixth signal, the display module 202 can determine the sixth display sub-area 523 as the target area, and can determine the content currently displayed in the target area as target content. The display module 202 can further merge the plurality of sub-areas (i.e., the fourth display sub-area 521, the fifth display sub-area 522, and the sixth display sub-area 523) into one area, and obtain a merged area (the merged area is the second main display area 52, that is, the second main display area 52 is not divided into a plurality of areas).

Figure 6B:
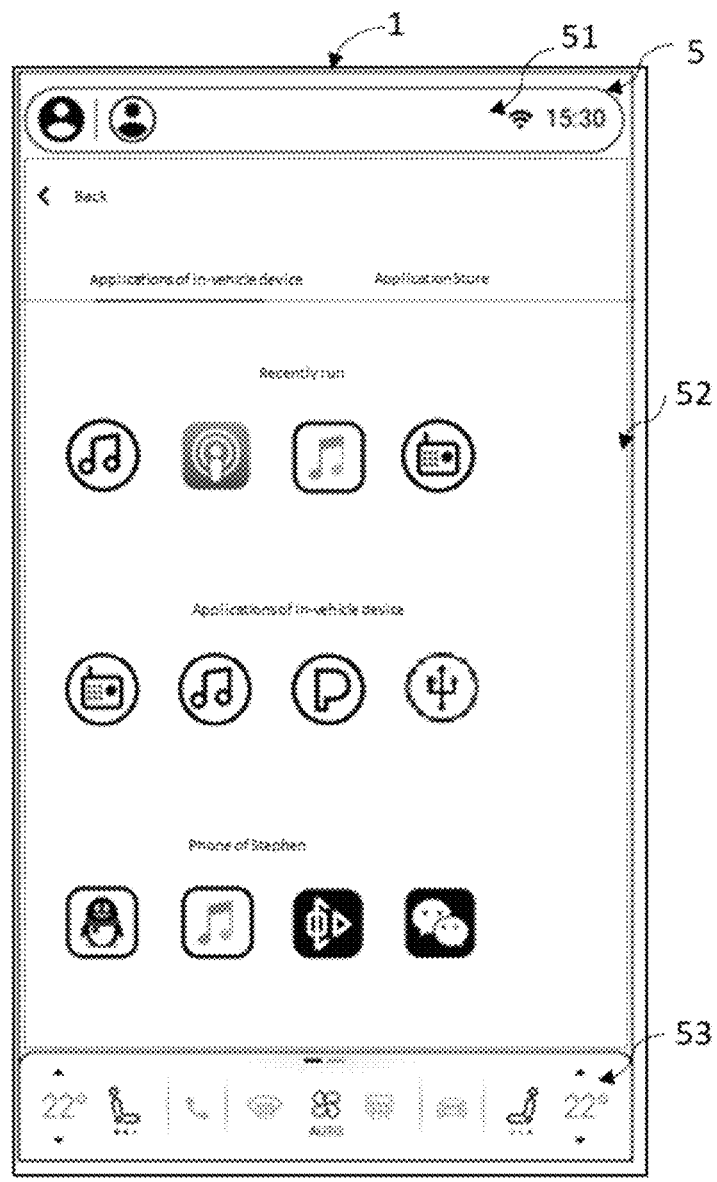
FIG. 6B illustrates a diagram of the third embodiment of displaying the related information of the in-vehicle device and the related information of the handheld device using the second user interface when the in-vehicle device and the handheld device are in communication.

Referring to FIG. 6B, the display module 202 can further display, in the merged area, the target content (such as the icons corresponding to the applications that the in-vehicle device 1 ever executed in the last week, and icons corresponding to the applications that the handheld device 2 ever executed in the last week), icons corresponding to all applications of the in-vehicle device 1 (e.g., circular icons of shown in the second main display area 52), and icons corresponding to all applications of the handheld device 2 (e.g., rectangular icons shown in the main display area 52).

In an embodiment, the display module 202 can display, in the merged area, the icons corresponding to all applications of the in-vehicle device 1 and the icons corresponding to all applications of the handheld device 2 randomly or in a preset order. In one embodiment, the preset order can be an order of installation time of each application installed to a corresponding device (i.e., the in-vehicle device 1 or the handheld device 2).

In an embodiment, referring to FIG. 6B, the display module 202 can display icons corresponding to the applications that the in-vehicle device 1 executed within the preset time period (for example, within the last week) and the icons corresponding to the applications that the handheld device 2 executed within the preset time period using one list (such as the "vehicle application"). The display module 202 can display icons corresponding to all applications of the in-vehicle device 1 and icons corresponding to all applications of the handheld device 2 using another list (such as the "Stephen's mobile phone").

At block S305, the determining module 201 can determine whether the in-vehicle device 1 is disconnected from the handheld device 2. When the in-vehicle device 1 is disconnected from the handheld device 2, the process returns to block S302. When the in-vehicle device 1 is still in communication with the handheld device 2, the process returns to block S304.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A user interface managing method applicable in an in-vehicle device, the method comprising:
    displaying related information of the in-vehicle device on a first user interface, wherein the first user interface comprises at least one display sub-area;
    acquiring an authority of a handheld device, when the handheld device is in communication with the in-vehicle device;
    obtaining related information of the handheld device when the authority is acquired; and
    displaying the related information of the in-vehicle device and the related information of the handheld device on a second user interface, wherein the second user interface comprises three display sub-areas, the at least one display sub-area of the first user interface and one of the display sub-areas of the second user interface have the same shape and size, one of the three display sub-areas of the second user interface displays the related information of the handheld device, one of the three display sub-areas of the second user interface displays the related information of the in-vehicle device, and one of the three display sub-areas of the second user interface displays the related information of the handheld device and the related information of the in-vehicle device.

2. The user interface managing method according to claim 1, wherein when the first user interface displays related information about a navigation interface of a first navigation application of the in-vehicle device, the in-vehicle device obtains related information about navigation data of a second navigation application of the handheld device.

3. The user interface managing method according to claim 2, wherein the navigation data of the second navigation application of the handheld device comprises a destination that the second navigation application navigated to within a preset time period.

4. The user interface managing method according to claim 1, wherein when the first user interface displays related information about a video/audio interface of a first music application of the in-vehicle device, the in-vehicle device obtains related information about video/audio data of a second music application of the handheld device.

5. The user interface managing method according to claim 4, wherein the video/audio data of the second music application comprises a recently played music and a playing progress of the recently played music, an identifier of a user who logs in to the second music application, video/audio files played by the handheld device within a preset time period, cover pages corresponding to the video/audio files played by the handheld device within the preset time period, and a list of favorite songs of the handheld device.

6. The user interface managing method according to claim 1, further comprises;
    synchronizing a list of favorite songs corresponding to each of a plurality of users to the in-vehicle device.

7. An in-vehicle device comprising:
    a storage device;
    at least one processor; and the storage device storing one or more programs, which when executed by the at least one processor, cause the at least one processor to:

display related information of the in-vehicle device on a first user interface, wherein the first user interface comprises at least one display sub-area;

acquire an authority of a handheld device, when the handheld device is in communication with the in-vehicle device;

obtain related information of the handheld device when the authority is acquired; and display the related information of the in-vehicle device and the related information of the handheld device on a second user interface, wherein the second user interface comprises three display sub-areas, the at least one display sub-area of the first user interface and one of the display sub-areas of the second user interface have the same shape and size, wherein one of the three display sub-areas of the second user interface displays the related information of the handheld device, one of the three display sub-areas of the second user interface displays the related information of the in-vehicle device, and one of the three display sub-areas of the second user interface displays the related information of the handheld device and the related information of the in-vehicle device.

8. A user interface managing method applicable in an in-vehicle device, the method comprising:

displaying related information of the in-vehicle device on a first user interface, wherein the first user interface comprises at least one display sub-area;

acquiring an authority of a handheld device, when the handheld device is in communication with the in-vehicle device;

obtaining related information of the handheld device when the authority is acquired; and displaying the related information of the in-vehicle device and the related information of the handheld device on a second user interface, wherein the second user interface comprises three display sub-areas, one of the three display sub-areas of the second user interface displays the related information of the handheld device, one of the three display sub-areas of the second user interface displays the related information of the in-vehicle device, and one of the three display sub-areas of the second user interface displays the related information of the handheld device and the related information of the in-vehicle device.

* * * * *